US008252416B2

(12) United States Patent
Jun et al.

(10) Patent No.: US 8,252,416 B2
(45) Date of Patent: Aug. 28, 2012

(54) NANOCRYSTAL-METAL OXIDE COMPLEX COMPRISING AT LEAST TWO DIFFERENT SURFACTANTS AND METHOD FOR PREPARING THE SAME

(75) Inventors: Shin Ae Jun, Seongnam-si (KR); Eun Joo Jang, Suwon-si (KR); Hye Ran Choi, Suwon-si (KR); Jung Eun Lim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1158 days.

(21) Appl. No.: 11/932,249

(22) Filed: Oct. 31, 2007

(65) Prior Publication Data

US 2008/0290936 A1 Nov. 27, 2008

(30) Foreign Application Priority Data

Apr. 25, 2007 (KR) ........................ 10-2007-0040384

(51) Int. Cl.
*B32B 5/16* (2006.01)

(52) U.S. Cl. ..................... 428/403; 423/592.1; 428/699; 428/700; 428/701; 428/704; 977/811; 977/813; 977/830

(58) Field of Classification Search ............... 423/592.1; 428/403, 699, 700, 701, 704; 977/811, 813, 977/830
See application file for complete search history.

(56) References Cited

U.S. PATENT DOCUMENTS 6,177,088 B1 * 1/2001 Guo et al. ..................... 424/400
6,251,303 B1 * 6/2001 Bawendi et al. ....... 252/301.4 R
6,468,808 B1 * 10/2002 Nie et al. ...................... 436/524
6,797,380 B2 * 9/2004 Bonitatebus et al. ...... 428/842.2
7,067,072 B2 * 6/2006 Chen ....................... 252/301.6 S
7,226,953 B1 * 6/2007 Petruska et al. ................ 516/98
7,288,468 B2 * 10/2007 Jang et al. ..................... 438/500
7,405,002 B2 * 7/2008 Ying et al. .................... 428/404
7,476,487 B2 * 1/2009 Park et al. .................. 430/270.1
7,645,397 B2 * 1/2010 Parce et al. .............. 252/301.36
7,824,731 B2 * 11/2010 Ying et al. .................... 427/212
7,842,385 B2 * 11/2010 Jang et al. ..................... 428/403
7,927,515 B2 * 4/2011 Jang et al. ..................... 252/500
8,092,719 B2 * 1/2012 Jun et al. .................... 252/519.2
2006/0029802 A1 * 2/2006 Ying et al. .................... 428/403
2009/0294742 A1 * 12/2009 Jang et al. ................. 252/519.2

FOREIGN PATENT DOCUMENTS

WO 2005049711 A2 6/2005

* cited by examiner

*Primary Examiner* — Hoa (Holly) Le
(74) *Attorney, Agent, or Firm* — Cantor Colburn LLP

(57) ABSTRACT

Disclosed herein is a nanocrystal-metal oxide complex. The nanocrystal of the nanocrystal-metal oxide complex is substituted with two or more different types of surfactants which are miscible with a metal oxide precursor and enable maintenance of luminescent and electrical properties of the nanocrystal. The nanocrystal-metal oxide complex exhibits superior optical and chemical stability and secures high luminescent efficiency of the nanocrystal. Accordingly, when the nanocrystal-metal oxide complex is used as a luminescent material of an electroluminescent device, it can improve luminescent efficiency and reliability of products. Further disclosed herein is a method for preparing the nanocrystal-metal oxide complex.

11 Claims, 3 Drawing Sheets

120
100
OH
Si
130
110
101

Ex. 1 C. Ex. 1 C. Ex. 2

Before heating

After heating

NANOCRYSTAL-METAL OXIDE COMPLEX COMPRISING AT LEAST TWO DIFFERENT SURFACTANTS AND METHOD FOR PREPARING THE SAME

CROSS REFERENCE TO RELATED APPLICATION

This non-provisional application claims priority to Korean Patent Application No. 2007-40384 filed on Apr. 25, 2007, and all the benefits accruing therefrom under 35 U.S.C. §119 (a), the content of which is herein incorporated by reference in its entirety.

BACKGROUND OF THE INVENTION

1. Field of the Invention

The present invention relates to a nanocrystal-metal oxide complex and a method for preparing the complex. More specifically, the present invention relates to a nanocrystal-metal oxide complex with improved luminescent efficiency, superior optical stability and excellent chemical stability which comprises a nanocrystal and metal oxide substituted with two or more surfactants, and a method for preparing the complex.

2. Description of the Related Art

A semiconductor nanocrystal is a crystalline material generally having a particle size (i.e., a particle diameter) of a few nanometers up to about 10 nm, and consists of a cluster of several hundred to several thousand atoms. Such a small-sized semiconductor nanocrystal has a large surface area per unit volume, and therefore most of the constituent atoms of the nanocrystal are present on or near the surface of the nanocrystal. Based on this characteristic structure, a semiconductor nanocrystal exhibits quantum confinement effects and shows electrical, magnetic, optical, chemical and mechanical properties that differ from those inherent to the constituent atoms of the nanocrystal, or from bulk properties of the constituent atoms of the nanocrystal.

Control over the physical size and composition of semiconductor nanocrystals enables the control of the properties of the nanocrystals. Accordingly, semiconductor nanocrystals can be utilized in a variety of applications including: luminescent devices such as light-emitting diodes ("LEDs"), electroluminescence ("EL") devices, lasers, holographic devices, and sensors; and electronic devices such as solar cells and photodetectors. For various applications, nanocrystals must be incorporated in an appropriate matrix. Accordingly, nanocrystals must exhibit excellent dispersibility and formability in a medium (e.g., a solution) as well as superior luminescent properties.

Nanocrystals are generally prepared by a wet chemistry technique wherein a precursor material is added to a coordinating organic solvent to grow nanocrystals to the desired size. In a wet chemistry technique, as nanocrystals are grown, the organic solvent can coordinate to the surface of the nanocrystals, thus acting as a dispersant for the nanocrystals. Accordingly, the organic solvent allows the semiconductor nanocrystals to grow to nanometer-scale. The wet chemistry technique has an advantage in that nanocrystals having a variety of sizes can be uniformly prepared by appropriately controlling the concentration of precursors used, the kind of organic solvents, and preparation temperature and time, and the like. Also, according to the wet chemistry technique, since nanocrystals have a large surface area per unit volume due to their extremely small size, they are vulnerable to surface defects readily undergo aggregation. The surface defects act as energy traps between energy bandgaps, thereby disadvantageously causing a deterioration in luminescent efficiency.

In an attempt to overcome this, preparation of a nanocrystal-metal oxide complex in which nanocrystals are dispersed in a transparent metal oxide matrix has been proposed as a way to improve the stability of nanocrystals by preventing oxidation or aggregation of nanocrystals, both of which phenomena results from outside stimulus. The surface of nanocrystals prepared by the wet chemistry process is surrounded by an organic surfactant. Based on this, and to allow the nanocrystals to be dispersed in the metal oxide matrix, some methods have been suggested in which the materials coordinated to the surface of the nanocrystals are substituted with a surfactant, which is compatible with metal oxide precursors. For example, methods for preparing nanocrystal-metal oxide complexes by substituting the surface of nanocrystals with an alkyl silane-based surfactant and mixing the nanocrystals with a metal oxide precursor are known, wherein the alkyl silane-based surfactant has a terminal group (such as thiol (—SH), amino (—$NH_2$) or carboxy (—COOH)) capable of binding to the surface of nanocrystals at one end, and a $Si(OR)_3$ terminal group at the other end. International Patent Publication No. WO 2005/049711 discloses a method for preparing nanocrystal-metal oxide complexes by substituting the surface of nanocrystals with a surfactant which has at least one group (e.g., —SH, —$NH_2$ or —COOH) capable of at one end binding to the surface of nanocrystals, and a hydrophilic group (e.g., —OH, —COOH, —$NH_2$, —$PO_3H_2$, —$SO_3H$ or —CN) at one other end, that is capable of interacting with the solvent.

However, these conventional methods, such as methods for preparing nanocrystal-metal oxide complexes wherein the surface of nanocrystals is substituted with one type of surfactant, have a difficulty in dispersing nanocrystals in a metal oxide matrix while luminescent and electrical properties of the nanocrystals are maintained. In addition, there is a limitation that the nanocrystal-metal oxide complexes prepared by the methods has poor luminescent property and stability.

BRIEF SUMMARY OF THE INVENTION

Therefore, in view of the above problems of the prior art, in an embodiment, a nanocrystal-metal oxide complex with improved luminescent efficiency as well as superior optical stability and excellent chemical stability, is provided.

In another embodiment, a method for preparing the nanocrystal-metal oxide complex is also provided.

In accordance with an embodiment, there is provided a nanocrystal-metal oxide complex comprising a nanocrystal and metal oxide wherein the surface of the nanocrystal is substituted with two or more different surfactants.

In an embodiment, one of the surfactants is a hydrophilic surfactant and the other an alkyl amine surfactant.

In an embodiment, the hydrophilic surfactant is at least one compound represented by Formula 1 below:

$$A_n\text{-}(R_m)\text{—}B_l \qquad (1)$$

wherein A is selected from the group consisting of thiol, amino, carboxylic acid, phosphonic acid, phosphine oxide, nitrile, and thiocyanate;

B is selected from the group consisting of hydroxyl, carboxylic acid, amino, phosphonic acid, and sulfonic acid;

R is at least one selected from the group consisting of hydrocarbon including $C_{1-30}$ alkyl and $C_{6-30}$ aryl, and $C_{2-30}$ polyethers including ethylene oxide and propylene oxide;

n and l are each independently an integer of one or greater; and m is an integer from 1 to 22.

In another embodiment, the alkyl amine surfactant is selected from the group consisting of monomethylamine, dimethylamine, trimethylamine, monoethylamine, diethylamine, triethylamine isopropylamine, diisopropylamine, mono-n-propylamine, di-n-propylamine, tri-n-propylamine, mono-n-butylamine, di-n-butylamine, tri-n-butylamine, mono-sec-butylamine, di-sec-butylamine, tri-sec-butylamine, mono-tert-butylamine, di-tert-butylamine, cyclohexylamine, dicyclohexylamine, octylamine, dodecylamine, hexadecylamine, dimethylaminoethylamine, N-ethylethylenediamine, N,N-dimethyl-1,3-propanediamine, and a mixture thereof. In another embodiment, the metal oxide is selected from the group consisting of $TiO_2$, ZnO, $SiO_2$, $SnO_2$, $WO_3$, $Ta_2O_3$, $BaTiO_3$, $BaZrO_3$, $ZrO_2$, $HfO_2$, $Al_2O_3$, $Y_2O_3$, $ZrSiO_4$, $Fe_2O_3$, $Fe_3O_4$, CeO, $CrO_3$ and a mixture thereof.

In another embodiment, the nanocrystal is composed of one selected from the group consisting of Group II-VI, Group II-V, Group III-VI, Group III-V, Group IV-VI, Group I-III-VI, Group II-IV-VI and Group II-IV-V semiconductor compounds, and alloys and combinations thereof.

In accordance with still another embodiment, there is provided a method for preparing a nanocrystal-metal oxide complex comprising: (a) reacting a nanocrystal with two or more different surfactants to substitute the surface of the nanocrystal with the surfactants; and (b) mixing the nanocrystal with a metal oxide precursor, a solvent and water, followed by drying.

In accordance with yet another embodiment, there is provided an electronic device comprising the nanocrystal-metal oxide complex.

BRIEF DESCRIPTION OF THE DRAWINGS

The above and other features and advantages of the present invention will be more clearly understood from the following detailed description taken in conjunction with the accompanying drawings, in which.

DESCRIPTION OF THE PREFERRED EMBODIMENTS

Figure 1:
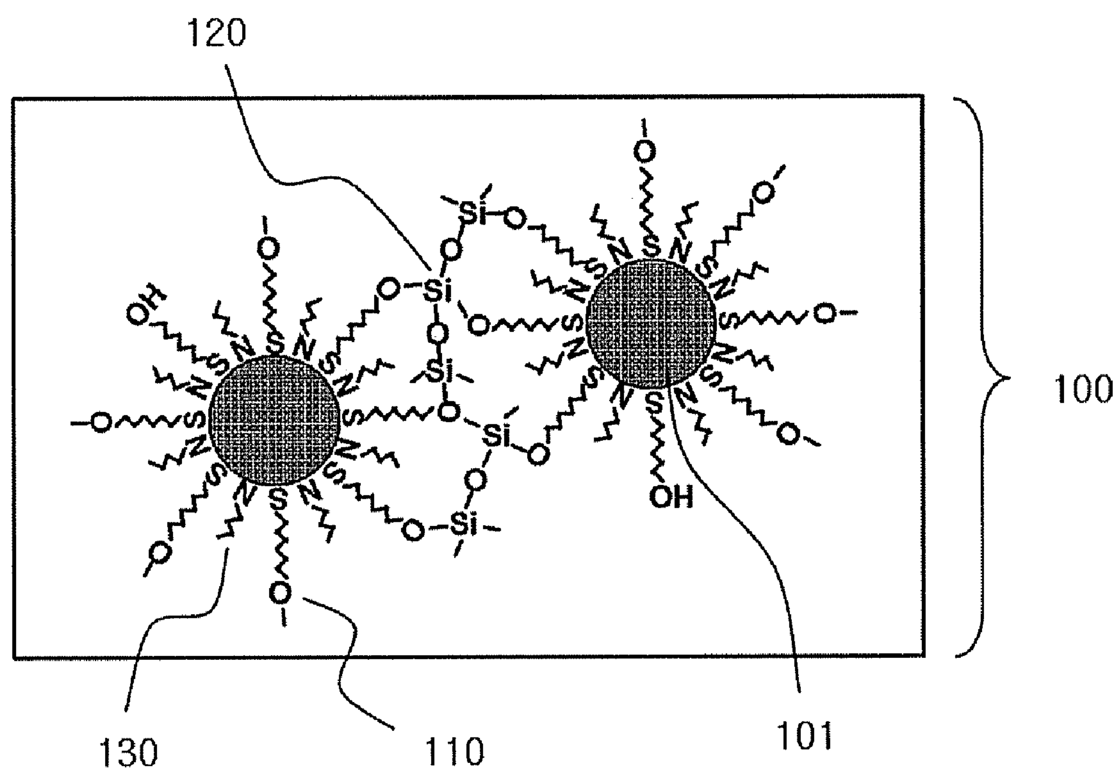
FIG. 1 is a schematic diagram showing the structure of an exemplary semiconductor nanocrystal-metal complex according to one embodiment.

The present invention will now be described in greater detail with reference to the accompanying drawings.

It will be understood that when an element is referred to as being "on" another element, it can be directly on the other element or intervening elements can be present therebetween. In contrast, when an element is referred to as being "disposed on" or "formed on" another element, the elements are understood to be in at least partial contact with each other, unless otherwise specified.

The terminology used herein is for the purpose of describing particular embodiments only and is not intended to be limiting of the invention. As used herein, the singular forms "a", "an" and "the" are intended to include the plural forms as well, unless the context clearly indicates otherwise. The use of the terms "first", "second", and the like do not imply any particular order but are included to identify individual elements. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements and the thicknesses of layers and regions are exaggerated for clarity.

Disclosed herein is a nanocrystal-metal oxide complex in which the surface of a nanocrystal is substituted with two or more different surfactants. One of the surfactants is a hydrophilic surfactant and the other is an alkyl amine surfactant.

FIG. 1 is a schematic diagram showing the structure of a nanocrystal-metal oxide complex according to one embodiment of the present invention. As shown in FIG. 1, the nanocrystal-metal oxide complex 100 is characterized in that the surface of the nanocrystal 101 is substituted with two or more surfactants of different types. That is, the nanocrystal of the nanocrystal-metal oxide complex is coordinated to both of: a hydrophilic surfactant that can react to form hydrophilic surfactant structures 110 that are miscible with and reactive toward a metal oxide precursor, and with which the hydrophilic surfactant can form metal oxide structures 120; and an alkyl amine surfactant 130 which protects the surface and allows the luminescent and electrical properties of the nanocrystal to be maintained. Accordingly, the nanocrystal-metal oxide complex 100 has advantages of maintaining the luminescent and electrical properties of the nanocrystal, while exhibiting superior stability and formability. As used herein, "stability" refers generally to both structural stability, in which the integrity of the structure of the nanocrystal-metal oxide complex is maintained when challenged with various environmental conditions such as, for example, thermal, humidity, pH, electrical, radiation (e.g., light), mechanical (e.g., abrasion), and the like; and to property stability, in which the nanoparticle exhibits consistent appearance properties (e.g., color) or performance properties (e.g., luminescence, mechanical, electrical, and the like) when subject to the above environmental conditions. "Formability", as used herein, means ability of the nanocrystal-metal oxide complex to be formed, alone or in combination with other components, into articles of different shapes and dimensions, and by suitable processes. The surface of the nanocrystal can in this way be appropriately and efficiently coordinated to by the surfactant without any significant defects, and the alkyl amine surfactant controls a dry speed by rendering a solvent to be slowly evaporated. Based on these characteristics, the nanocrystal-metal oxide complex can be prepared in a monolith form.

In an embodiment, the hydrophilic surfactant is represented by Formula 1 below:

$$A_n\text{-}(R_m)\text{—}B_l \qquad (1)$$

wherein A is selected from the group consisting of thiol, amino, carboxylic acid, phosphonic acid, phosphine oxide, nitrile, and thiocyanate;

B is selected from the group consisting of hydroxyl, carboxylic acid, amino, phosphonic acid, and sulfonic acid;

R is at least one selected from the group consisting of a hydrocarbon including $C_{1-30}$ alkylene and $C_{6-30}$ arylene, and $C_{2-30}$ polyether units including ethylene oxide and propylene oxide;

n and l are each independently an integer of one or greater; and m is an integer from 1 to 22.

Also in an embodiment, the other surfactant is an alkyl amine surfactant including a primary amine, a secondary amine and a tertiary amine. Non-limiting examples of the alkyl amine include, but are not limited to monomethylamine, dimethylamine, trimethylamine, monoethylamine, diethylamine, triethylamine isopropylamine, diisopropylamine, mono-n-propylamine, di-n-propylamine, tri-n-propylamine, mono-n-butylamine, di-n-butylamine, tri-n-butylamine, mono-sec-butylamine, di-sec-butylamine, tri-sec-butylamine, mono-tert-butylamine, di-tert-butylamine, cyclohexylamine, dicyclohexylamine, octylamine, dodecylamine, hexadecylamine, dimethyl aminoethylamine, N-ethylethylenediamine, N,N-dimethyl-1,3-propanediamine, and a mixture thereof.

The nanocrystal-metal oxide complex comprises metal oxides. Exemplary metal oxides include, for example, $TiO_2$, ZnO, $SiO_2$, $SnO_2$, $WO_3$, $Ta_2O_3$, $BaTiO_3$, $BaZrO_3$, $ZrO_2$, $HfO_2$, $Al_2O_3$, $Y_2O_3$, $ZrSiO_4$, $Fe_2O_3$, $Fe_3O_4$, CeO, $CrO_3$ and a mixture thereof, but the nanocrystal-metal oxide complex is should not be considered as limited to these metal oxides. The nanocrystal-metal oxide complex can be prepared in a powder, thin film, or monolith form.

The nanocrystal constituting the nanocrystal-metal oxide complex includes nanocrystals (e.g., metal nanocrystals and semiconductor nanocrystals) that can be prepared by wet chemistry processes. Materials for semiconductor nanocrystals can be selected from the group consisting of Group II-VI, Group II-V, Group III-VI, Group III-V, Group IV-VI, Group I-III-VI, Group II-IV-VI and Group II-IV-V semiconductor compounds, alloys thereof, and combinations thereof.

Specifically, in an embodiment, the nanocrystal that can be used in the present invention can be composed of at least one nanocrystal material selected from the group consisting of CdS, CdSe, CdTe, ZnS, ZnSe, ZnTe, HgS, HgSe, HgTe, GaN, GaP, GaAs, InP, InAs, InSb, AlN, AlP, AlAs, AlSb, SiC, Fe, Pt, Ni, Co, Al, Ag, Au, Cu, FePt, Si, Ge, PbS, PbSe, PbTe, alloys thereof, and combinations thereof.

Where two or more nanocrystal materials are present as the nanocrystal, they can be partially localized (i.e., can have a layered, core-shell, or other composite structure) or can be present in admixture or alloy form. The size of nanocrystal is not especially limited, but can be, in an embodiment from 2 nm to 20 nm, specifically from 3 nm to 15 nm.

The nanocrystal can have a core-shell structure wherein a shell surrounds and partially or fully encases one or more cores, the shell being composed of a material having a large band gap that is greater than that of the core. Exemplary shell materials can include ZnS or ZnSe. The nanocrystal core is a nanocrystal material selected from the group consisting of CdS, CdSe, CdTe, ZnS, ZnSe, ZnTe, HgS, HgSe, HgTe, GaN, GaP, GaAs, InP, InAs, InSb, AlN, AlP, AlAs, AlSb, SiC, Fe, Pt, Ni, Co, Al, Ag, Au, Cu, FePt, Si, Ge, PbS, PbSe, PbTe, alloys thereof, and combinations thereof. The nanocrystal shell is a second nanocrystal material selected from the group consisting of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, and alloys and combinations thereof. Where a core-shell structure is used, the nanocrystal materials of the core and shell are not identical. More than one shell can be present for a single core, where subsequent shells are formed to surround and encase, in whole or in part, the previously formed shell, where the subsequently formed shell has a larger band-gap than the previously formed shell.

The nanocrystal of the nanocrystal-metal oxide complex can have various shapes depending on reaction conditions. Specifically, the nanocrystal has a shape selected from the group consisting of spheres, tetrahedrons, cylinders, rods, triangles, discs, tripods, tetrapods, cubes, boxes, stars, and tubes, but is not necessarily limited thereto. The nanocrystal can efficiently emit light in a visible region of the spectrum and in other regions including ultraviolet and infrared regions.

Prior to surface substitution, the surface of the nanocrystal is selectively coordinated to by an organic material (e.g., a solvent). The coordination of the nanocrystal surface to the organic material contributes to improvement in suspension stability (i.e., stability of the suspended nanocrystals in a solution or dispersion) and prevention of aggregation between nanocrystals, by forming a layer at the surface of the nanocrystal. The organic material comprises a solvent, which is used in the process of nanocrystal growth. Examples of the organic material include, but are not limited thereto $C_6$-$C_{22}$ alkanes and alkenes having a terminal carboxylic acid (COOH) group; $C_6$-$C_{22}$ alkanes and alkenes having a terminal phosphonic acid ($—PO_3H_2$) group; alkanes and alkenes having a phosphine oxide (—PO) group; $C_6$-$C_{22}$ alkanes and alkenes having a terminal sulfinic (SOOH) group; and $C_6$-$C_{22}$ alkanes and alkenes having a terminal amino ($—NH_2$) group. Examples of specific organic materials include oleic acid, stearic acid, palmitic acid, hexylphosphonic acid, n-octylphosphonic acid, tetradecylphosphonic acid, octadecylphosphonic acid, n-octyl amine, and hexadecyl amine.

Figure 2:
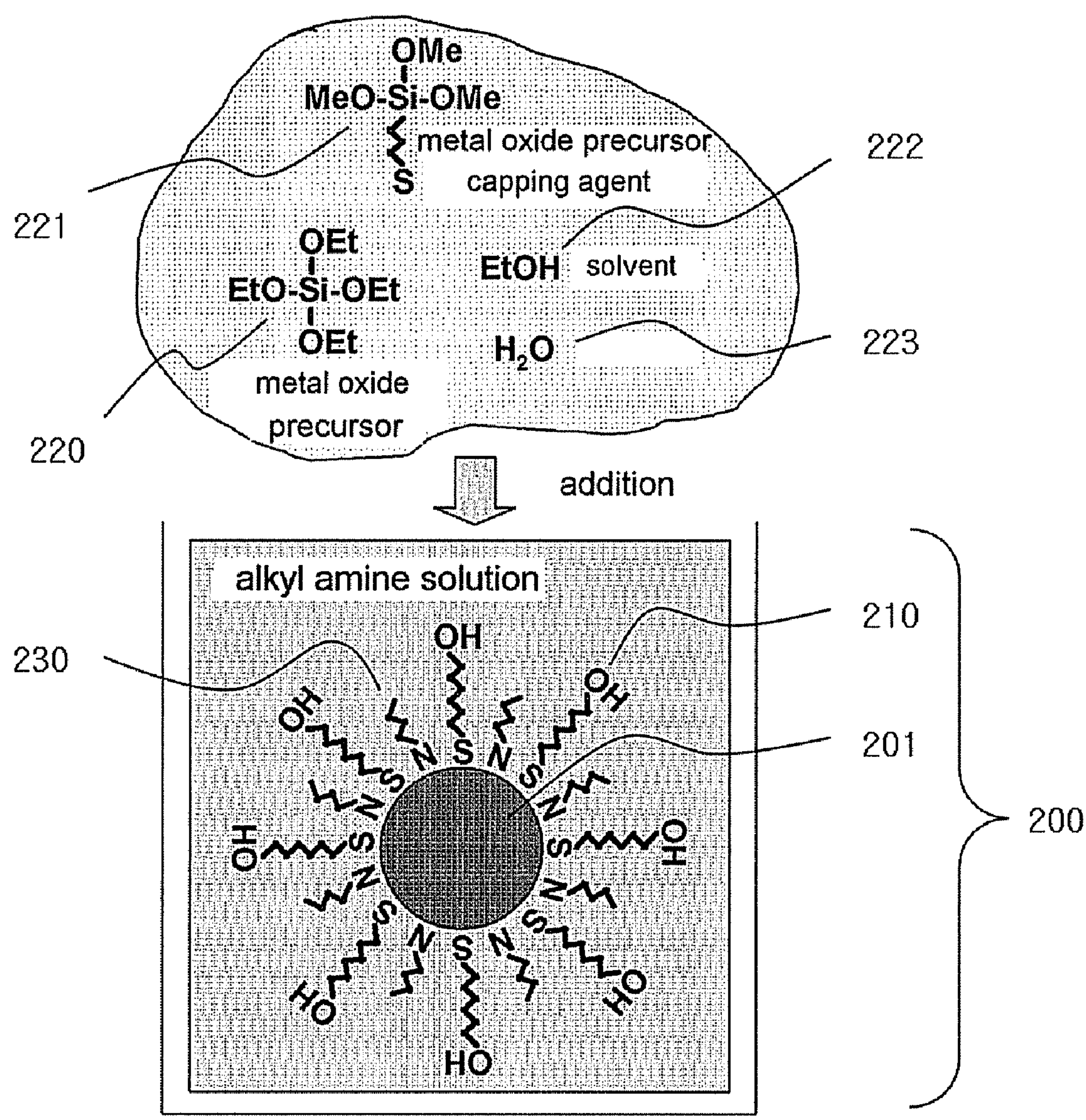
FIG. 2 is a schematic diagram illustrating an exemplary method of preparing for a semiconductor nanocrystal-metal complex according to one embodiment.

In another embodiment, a method for preparing a nanocrystal-metal oxide complex is disclosed. FIG. 2 is a schematic diagram illustrating a method for preparing a nanocrystal-metal oxide complex according to one embodiment. The method comprises, in an embodiment, addition of a combination of metal oxide precursor 220, metal oxide precursor capping agent 221, ethanol 222 as solvent, and water 223, to an alkylamine solution of the nanocrystal-surfactant complex 200 comprising a nanocrystal 201 with hydrophilic surfactant 210 and alkylamine surfactant 230 The method will be explained in greater detail with reference to the accompanying drawings.

According to the method, first, a nanocrystal is reacted with two or more types of surfactants to displace the solvent layer at the surface of the nanocrystal with the surfactants (step a). Generally, nanocrystals can be surrounded by a hydrophobic surfactant adhering to the surface of the nanocrystal; and in an embodiment, such a nanocrystal can be used. The nanocrystal surface-substituted with two or more types of surfactants (i.e., the nanocrystal-surfactant complex 200), or a solution of the nanocrystal-surfactant complex 200 is mixed with (i.e., has added to it) a metal oxide precursor 220, a solvent 222 and water 223, followed by drying, to induce a crosslink reaction (Step b). A capping agent 221 having a terminal $Si(OR)_3$ group can be added to improve the dispersibility and stability of the resulting nanocrystal-metal oxide complex. In an embodiment, the drying of the nanocrystal-metal oxide complex is carried out at 60° C. to 150° C. to improve the hardness of the nanocrystal-metal oxide complex.

Of the two or more different kinds of surfactants used for surface substitution of the nanocrystal, one is a hydrophilic surfactant and the other is an alkyl amine surfactant. The hydrophilic surfactant can be used singly or in combination thereof. The hydrophilic surfactant allows the nanocrystal to be miscible with and reactive toward a metal oxide precursor. The alkyl amine surfactant protects the surface of the nanocrystal, thereby maintaining the luminescent and electrical properties of the nanocrystal.

Where the mixture of the nanocrystal and the metal oxide precursor solvent is dried rapidly, cracks in the nanocrystal-metal oxide complex can be created, making it impossible to prepare the nanocrystal-metal oxide complex in a monolith form. However, since the alkyl amine surfactant can be selected to adjust the drying speed to a desired low level, a nanocrystal-metal oxide complex can thereby be prepared in a monolith form. Accordingly, the method allows preparation of a nanocrystal-metal oxide complex in any form which is suitable for an intended use of the complex.

The method can be applied to nanocrystals having various shapes such as, for example, spheres, tetrahedrons, cylinders, rods, triangles, discs, tripods, tetrapods, cubes, boxes, stars, or tubes.

The surface substitution of the nanocrystal with at least one hydrophilic surfactant and an alkyl amine surfactant is carried out by treating the nanocrystal surface with a solution containing a hydrophilic surfactant, an alkyl amine surfactant, and a solvent. Examples of the solvent include, but are not limited to $C_{1-20}$ alkyl alcohol, acetone, ethyl acetate, dichloromethane, chloroform, dimethylformamide, tetrahydrofuran, dimethylsulfoxide, pyridine, $C_{1-20}$ alkyl amine, and a mixture thereof.

As the hydrophilic surfactant miscible with a metal oxide precursor, any hydrophilic surfactant can be used without particular limitation so long as it has a functional group capable of being bound to the surface of the nanocrystal at one end of the hydrophilic surfactant molecule, such as —SH, —$NH_2$, —COOH, —$PO_3H_2$, —PO, —CN or —SCN; and a hydrophilic functional group such as —OH, —COOH, —$NH_2$, —$PO_3H_2$, —$SO_3H$ or —CN at the other end of the hydrophilic surfactant molecule. The hydrophilic surfactant can be a compound represented by the following Formula 1, but is not limited to thereto:

$$A_n\text{-}(R_m)\text{—}B_l \quad (1)$$

wherein A is selected from the group consisting of thiol, amino, carboxylic acid, phosphonic acid, phosphine oxide, nitrile and thiocyanate;

B is selected from the group consisting of hydroxyl, carboxylic acid, amino, phosphonic acid and sulfonic acid;

R is at least one selected from the group consisting of hydrocarbon including $C_{1-30}$ alkyl and $C_{6-30}$ aryl; and a $C_{2-30}$ polyether including ethylene oxide and propylene oxide;

n and l are each independently an integer of one or greater; and m is an integer from 1 to 22.

The alkyl amine surfactant reduces or eliminates defects of the surface of the nanocrystal-metal oxide complex, which result from surface substitution of the nanocrystal with a surfactant having a terminal hydrophilic group, which can allow maintaining luminescent and electrical properties of the nanocrystal. In addition, the alkyl amine surfactant acts as a drying control chemical additive, allowing the catalyst and metal oxide precursors for polymerizing the complex to be dried slowly. Accordingly, by use of the nanocrystal substituted with both a hydrophilic surfactant and an alkyl amine surfactant, a nanocrystal-metal oxide complex with superior luminescent and electrical properties can be prepared in a monolith form as well as in a powder or thin film form.

Examples of materials useful as an alkyl amine surfactant include, but are not limited to monomethylamine, dimethylamine, trimethylamine, monoethylamine, diethylamine, triethylamine isopropylamine, diisopropylamine, mono-n-propylamine, di-n-propylamine, tri-n-propylamine, mono-n-butylamine, di-n-butylamine, tri-n-butylamine, mono-sec-butylamine, di-sec-butylamine, tri-sec-butylamine, mono-tert-butylamine, di-tert-butylamine, cyclohexylamine, dicyclohexylamine, octylamine, dodecylamine, hexadecylamine, dimethylaminoethylamine, N-ethylethylenediamine, N,N-dimethyl-1,3-propanediamine, and mixtures thereof.

A nanocrystal material for use as the nanocrystal is without particular limitation so long as it possesses desirable properties. Specifically, in an embodiment, the material for the nanocrystal is selected from the group consisting of Group II-VI, Group II-V, Group III-VI, Group III-V, Group IV-VI, Group I-III-VI, Group II-IV-VI, and Group II-IV-V semiconductor compounds, alloys thereof, and combinations thereof. Non-limiting examples of the nanocrystal material include CdS, CdSe, CdTe, ZnS, ZnSe, ZnTe, HgS, HgSe, HgTe, GaN, GaP, GaAs, InP, InAs, InSb, AlN, AlP, AlAs, AlSb, SiC, Fe, Pt, Ni, Co, Al, Ag, Au, Cu, FePt, Si, Ge, PbS, PbSe, PbTe, alloys thereof, and mixtures thereof.

The nanocrystal can have a core-shell structure as described herein. The nanocrystal core can be selected from the group consisting of CdS, CdSe, CdTe, ZnS, ZnSe, ZnTe, HgS, HgSe, HgTe, GaN, GaP, GaAs, InP, InAs, InSb, AlN, AlP, AlAs, AlSb, SiC, Fe, Pt, Ni, Co, Al, Ag, Au, Cu, FePt, Pd, Si, Ge, PbS, PbSe, PbTe, alloys thereof, and mixtures thereof. The nanocrystal shell can be selected from the group consisting of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, Fe, Pt, Ni, Co, Al, Ag, Au, Cu, FePt, Pd, Si, Ge, alloys thereof, and mixtures thereof.

The nanocrystal can be prepared by any process known in the art. For example, in an embodiment, the nanocrystal is prepared by adding a Group V or VI precursor to a mixed system of a solvent and a dispersant containing a Group II, III, or IV precursor, and reacting the mixture.

Examples of the metal precursor that can be used in production of a nanocrystal core or shell include, but are not limited to dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, dimethyl cadmium, diethyl cadmium, cadmium acetate, cadmium acetylacetonate, cadmium iodide, cadmium bromide, cadmium chloride, cadmium fluoride, cadmium carbonate, cadmium nitrate, cadmium oxide, cadmium perchlorate, cadmium phosphide, cadmium sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bisacetylacetonate, tin bromide, tin chloride, tin fluoride, tin oxide, tin sulfate, germanium tetrachloride, germanium oxide, germanium ethoxide, gallium acetylacetonate, gallium chloride, gallium fluoride, gallium oxide, gallium nitrate, gallium sulfate, indium chloride, indium oxide, indium nitrate and indium sulfate.

Group VI or V compounds that can be used as materials for the nanocrystal core include alkyl thiol compounds such as for example, hexane thiol, octane thiol, decane thiol, dodecane thiol, hexadecane thiol, and mercaptopropyl silane), sulfur-trioctylphosphine (S-TOP), sulfur-tributylphosphine (S-TBP), sulfur-triphenylphosphine (S-TPP), sulfur-trioctylamine (S-TOA), trimethylsilyl sulfur, ammonium sulfide, sodium sulfide, selenium-trioctylphosphine (Se-TOP), selenium-tributylphosphine (Se-TBP), selenium-triphenylphosphine (Se-TPP), tellurium-tributylphosphine (Te-TBP), tellurium-triphenylphosphine (Te-TPP), trimethylsilyl phosphine, alkyl phosphines (e.g., triethylphosphine, tributylphosphine, trioctylphosphine, triphenylphosphine, tricyclohexylphosphine, arsenic oxide, arsenic chloride, arsenic sulfate, arsenic bromide, arsenic iodide, nitric oxide, nitric acid and ammonium nitrate.

Examples of solvents that can be used in step (b) of the method include $C_{6-22}$ primary alkyl amines, $C_{6-22}$ secondary alkyl amines, $C_{6-22}$ tertiary alkyl amines, $C_{6-22}$ primary alcohols, $C_{6-22}$ secondary alcohols, $C_{6-22}$ tertiary alcohols, $C_{6-22}$ ketones, $C_{6-22}$ esters, $C_{6-22}$ heterocyclic compounds containing nitrogen and/or sulfur, $C_{6-22}$ alkanes, $C_{6-22}$ alkenes, $C_{6-22}$ alkynes, trioctylamine, trioctylphosphine, or trioctylphosphine oxide.

The metal precursor that can be used is selected from a metal alkoxide, metal halide, or metal hydroxide.

Examples of the metal alkoxide include, but are not limited to, titanium methoxide, titanium ethoxide, titanium isopropoxide, titanium butoxide, zinc methoxide, zinc ethoxide, zinc isopropoxide, zinc butoxide, tetramethylorthosilicate (TMOS), tetraethylorthosilicate (TEOS), silicon tetraisopropoxide, silicon tetrabutoxide, trimethoxysilane, triethoxysilane, mercaptopropyltrimethoxy silane, mercaptopropyltriethoxysilane, aminopropyltrimethoxysilane, aminopropyltriethoxysilane, tin methoxide, tin ethoxide, tin isopropoxide, tin butoxide, tungsten methoxide, tungsten ethoxide, tungsten isopropoxide, tungsten butoxide, tantalum methoxide, tantalum ethoxide, tantalum isopropoxide, tantalum butoxide, barium methoxide, barium ethoxide, barium isopropoxide, barium butoxide, zirconium methoxide, zirconium ethoxide, zirconium isopropoxide, zirconium butoxide, aluminum methoxide, aluminum ethoxide, aluminum isopropoxide, aluminum butoxide, yttrium methoxide, yttrium ethoxide, yttrium isopropoxide, yttrium butoxide, iron methoxide, iron ethoxide, iron isopropoxide, iron butoxide, cesium methoxide, cesium ethoxide, cesium isopropoxide, cesium butoxide, chromium methoxide, chromium ethoxide, chromium isopropoxide, chromium butoxide, or a mixture thereof.

Examples of the metal halide include, but are not limited to titanium chloride, zinc chloride, silicon tetrachloride, tin chloride, tungsten chloride, tantalum chloride, barium chloride, zirconium chloride, hafnium chloride, aluminum chloride, yttrium chloride, iron (II) chloride, iron (III) chloride, cesium chloride, chromium chloride, titanium chloride, zinc bromide, silicon tetrabromide, tin bromide, tungsten bromide, tantalum bromide, barium bromide, zirconium bromide, hafnium bromide, aluminum bromide, yttrium bromide, iron (II) bromide, iron (III) bromide, cesium bromide, chromium bromide, titanium iodide, zinc iodide, silicon tetraiodide, tin iodide, tungsten iodide, tantalum iodide, barium iodide, zirconium iodide, yttrium iodide, iron (II) iodide, iron (III) iodide, cesium iodide, chromium iodide, or a mixture thereof.

Examples of the metal hydroxide include, but are not limited to titanium hydroxide, zinc hydroxide, silicon hydroxide, tin hydroxide, tungsten hydroxide, tantalum hydroxide, barium hydroxide, zirconium hydroxide, hafnium hydroxide, aluminum hydroxide, yttrium hydroxide, iron (II) hydroxide, iron (III) hydroxide, cesium hydroxide, chromium hydroxide, or a mixture thereof.

In another embodiment, an electronic device comprises the nanocrystal-metal oxide complex. The nanocrystal-metal oxide complex can be utilized in various applications including displays (e.g., plasma display panels ("PDPs") and luminescent diodes ("LEDs")), lasers, linear photodiodes, sensors (e.g., biosensors) reacting with a target material to emit light, and photovoltaic devices.

Hereinafter, the present invention will be explained in more detail with reference to the following examples. These examples are provided for the purpose of illustration and are not intended to limit the present invention.

EXAMPLES

Preparation Example 1

Preparation of CdSe/CdS.ZnS Nanocrystal 16 g of trioctylamine (TOA), 0.3 g of oleic acid and 0.4 mmol of cadmium oxide were simultaneously placed in a 100 ml-flask equipped with a reflex condenser. The reaction temperature of the mixture was adjusted to 300° C. with stirring to prepare a cadmium precursor solution. Separately, a selenium (Se) powder was dissolved in trioctylphosphine (TOP) to obtain a Se-TOP complex solution (Se concentration: ca. 1 M). 2 ml of the Se-TOP complex solution was rapidly fed to the cadmium precursor solution, followed by stirring for about 4 minutes to prepare a solution of a 2 mM solution of CdSe nanocrystal that emits light at a wavelength of 536 nm.

8 g of TOA, 0.1 g of oleic acid, 0.1 mmol of cadmium oxide and 0.1 mmol of zinc acetate were simultaneously placed in a 100 ml-flask equipped with a reflex condenser. The reaction temperature of the mixture was adjusted to 300° C. with stirring. After the CdSe nanocrystal solution was fed to the reaction mixture, a S-TOP complex solution (1 ml; S concentration: 0.4 M) was slowly added thereto over about 2 min. The reaction was allowed to proceed for about one hour.

Figure 3:
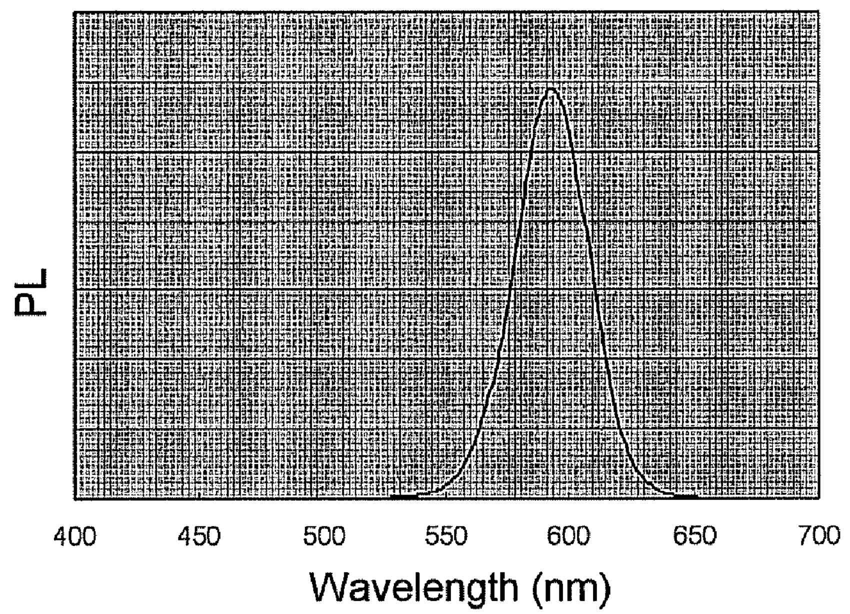
FIG. 3 is a photoluminescence spectrum of an exemplary CdSe/CdS.ZnS nanocrystal prepared in Preparation Example 1.

After the reaction was completed, the reaction mixture was cooled to room temperature as rapidly as possible. Ethanol (20 ml) as a non-solvent was added to the reaction mixture, and the resulting mixture was centrifuged. The obtained precipitate was separated from the supernatant, and dispersed in toluene (dispersion concentration: 1 wt %) to produce a CdSe/CdS.ZnS nanocrystal that has a diameter of 8 nm and emits light at a wavelength of 594 nm. FIG. 3 shows a photoluminescence spectrum of the CdSe/CdS.ZnS nanocrystal. FIG. 3 demonstrates that the CdSe/CdS.ZnS nanocrystal thus produced emits light at 594 nm.

Example 1

Preparation of CdSe/CdS.ZnS Nanocrystal-silica Complex

Ethanol (20 ml) was added to the 1 wt % nanocrystal toluene solution thus prepared. The mixture was centrifuged. The obtained precipitate was separated from the supernatant. Pyridine (5_ml) was added to the precipitate, followed by stirring until the mixture became clear. Hexane (20_ml) was added to the nanocrystal pyridine solution. The resulting mixture was centrifuged. The obtained precipitate was separated from the supernatant. Then, the precipitate was dissolved in 100 μL solution of 6-mercaptohexanol and propylamine (1:1 ratio, v/v) in 5 mL of pyridine, followed by stirring for about two hours.

Hexane (10 ml) was added to the resulting solution to precipitate the CdSe/CdS.ZnS nanocrystal. The obtained precipitate was separated from the supernatant. 200 μL of tetraethoxyorthosilane (TEOS), 100 μL of ethanol, 100 μL of propylamine and 50 μL of water were added to the precipitate, followed by stirring. The reaction mixture was charged in a round mold and dried at room temperature to yield a CdSe/CdS.ZnS nanocrystal-silica complex. The concentration of the nanocrystal can be adjusted within a range 0.01 to 20 vol % according to the amount of the nanocrystals and TEOS.

Example 2

Preparation of CdSe/CdS.ZnS Nanocrystal-titania Complex

Ethanol was added to the 1 wt % solution of nanocrystal in toluene thus prepared. The mixture was centrifuged. The obtained precipitate was separated from the supernatant. Pyridine (5 ml) was added to the precipitate, followed by stirring until the mixture became clear. Hexane (20_ml) was added to the nanocrystal pyridine solution. The resulting mixture was centrifuged. The obtained precipitate was separated from the supernatant. Then, the precipitate was dissolved in a 100 μL solution of 6-mercaptohexanol and propylamine in pyridine, followed by stirring for about two hours.

Hexane (10_ml) was added to the resulting solution. The obtained precipitate was separated from the supernatant. 200 μL of titanium butoxide, 100 μL of ethanol, 100 μL of propylamine and 50 μL of water were added to the precipitate, followed by stirring. The reaction mixture was charged in a round mold and dried at room temperature to yield a CdSe/CdS.ZnS nanocrystal-titania complex.

Comparative Example 1

Ethanol was added to the 1 wt % nanocrystal toluene solution thus prepared in Preparation Example 1. The mixture was centrifuged. The obtained precipitate was separated from the supernatant. Pyridine (5_ml) was added to the precipitate, followed by stirring until the mixture became clear. Hexane (20 mL) was added to the nanocrystal pyridine solution. The resulting mixture was centrifuged. The obtained precipitate was separated from the supernatant. Then, the precipitate was dissolved in a 100 μL solution of 6-mercaptohexanol in pyridine, followed by stirring for about two hours. Hexane (10 mL) was added to the resulting solution. The obtained precipitate was separated from the supernatant. 200 μL of TEOS, 100 μL of ethanol, 50 μL of water, and 100 μL of 5-aminopentanol as a catalyst were added to the precipitate, followed by stirring. The reaction mixture was charged in a round mold and dried at room temperature to yield a CdSe/CdS.ZnS nanocrystal-silica complex.

Comparative Example 2

Ethanol was added to the 1 wt % nanocrystal solution in toluene thus prepared in Preparation Example 1. The mixture was centrifuged. The obtained precipitate was separated from the supernatant. To the precipitate were added 100 μL of 5-aminopentanol, 200 μL of TEOS, 100 μL of ethanol and 50 μL of water, followed by stirring. The reaction mixture was charged in a round mold and dried at room temperature to yield a CdSe/CdS.ZnS nanocrystal-silica complex substituted with 5-aminopentanol.

Experimental Example 1

Figure 4:
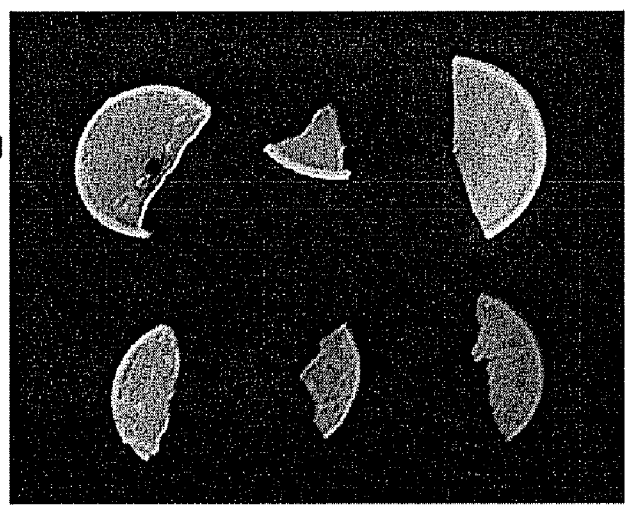
FIG. 4 is a set of photographs showing luminescent properties of exemplary nanocrystal-metal oxide complexes prepared in Example 1 and Comparative Examples 1 and 2.

To evaluate the luminescent properties of the nanocrystal-silica complexes prepared in Example 1 and Comparative Examples 1 and 2, the nanocrystal-silica complexes were heated in air at 150° C. and observed by luminescence spectroscopy. FIG. 4 is a photograph showing a comparison in luminescent property between the nanocrystal-silica complexes before and after heating. In FIG. 4, the nanocrystal-silica complexes before heating and the nanocrystal-silica complexes after heating are shown at the top and bottom, respectively. The nanocrystal-silica complexes corresponding to Example 1, Comparative Example 1 and Comparative Example 2 are shown from left to right.

As can be seen in FIG. 4, the nanocrystal-silica complex substituted with 6-nercaptohexanol and propanol in Example 1 exhibited substantially similar luminescent properties and shape before and after heating. Conversely, the luminescent properties and volume of the nanocrystal-silica complexes prepared in Comparative Examples 1 and 2 underwent significant reduction in the luminescent properties and volume, as a result of being greatly cracked after heating.

These results indicate that the nanocrystal-silica complex substituted with both a hydrophilic surfactant and an alkyl amine surfactant exhibits superior luminescent properties and thermal stability, as compared to the complex prepared from an amine compound having any other terminal group except for alkyl amine (Comparative Example 1) and the nanocrystal-silica complex substituted with a hydrophilic surfactant only (Comparative Example 2).

As can be seen from the foregoing, since the nanocrystal-metal oxide complex comprises two or more different types of surfactants, it can advantageously maintain luminescent and electrical properties of the nanocrystal, at the same time, exhibits improved thermal stability and optical stability. In addition, according to the method herein, a nanocrystal-metal oxide complex can be prepared in various forms e.g., powder, thin film and monolith.

The nanocrystal-metal oxide complex of the present invention exhibits superior stability as well as high luminescent efficiency. Accordingly, when the nanocrystal-metal oxide complex is applied to an electroluminescent device, it undergoes no deterioration in luminescent properties even at a high driving temperature of the device, thus realizing superior characteristics, as compared to other structural nanocrystal complexes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A nanocrystal-metal oxide complex comprising a nanocrystal and metal oxide, wherein the surface of the nanocrystal is substituted with two or more different surfactants, wherein one of the surfactants is a hydrophilic surfactant and the other is an alkyl amine surfactant.

2. The nanocrystal-metal oxide complex according to claim 1, wherein the hydrophilic surfactant is at least one compound represented by Formula I below:

$$A_n\text{-}(R_m)\text{—}B_l \quad (1)$$

wherein A is selected from the group consisting of thiol, amino, carboxylic acid, phosphonic acid, phosphine oxide, nitrile, and thiocyanate;

B is selected from the group consisting of hydroxyl, carboxylic acid, amino, phosphonic acid, and sulfonic acid;

R is at least one selected from the group consisting of hydrocarbon including $C_{1-30}$ alkyl and $C_{6-30}$ aryl, and $C_{2-30}$ polyether including ethylene oxide and propylene oxide;

n and l are each independently an integer of one or greater; and m is an integer from 1 to 22.

3. The nanocrystal-metal oxide complex according to claim 1, wherein the alkyl amine surfactant is selected from the group consisting of monomethylamine, dimethylamine, trimethylamine, monoethylamine, diethylamine, triethylamine isopropylamine, diisopropylamine, mono-n-propylamine, di-n-propylamine, tri-n-propylamine, mono-n-butylamine, di-n-butylamine, tri-n-butylamine, mono-sec-butylamine, di-sec-butylamine, tri-sec-butylamine, mono-tert-butylamine, di-tert-butylamine, cyclohexylamine, dicyclohexylamine, octylamine, dodecylamine, hexadecylamine, dimethylaminoethylamine, N-ethylethylenediamine, N,N-dimethyl-1,3-propanediamine, and a mixture thereof.

4. The nanocrystal-metal oxide complex according to claim 1, wherein the metal oxide is selected from the group consisting of $TiO_2$, ZnO, $SiO_2$, $SnO_2$, $WO_3$, $Ta_2O_3$, $BaTiO_3$, $BaZrO_3$, $ZrO_2$, $HfO_2$, $Al_2O_3$, $Y_2O_3$, $ZrSiO_4$, $Fe_2O_3$, $Fe_3O_4$, CeO, $CrO_3$, and a mixture thereof.

5. The nanocrystal-metal oxide complex according to claim 1, wherein the nanocrystal-metal oxide complex has a powder, thin film, or monolith form.

6. The nanocrystal-metal oxide complex according to claim 1, wherein the nanocrystal is composed of a nanocrystal material selected from the group consisting of Group II-VI, Group II-V, Group III-VI, Group III-V, Group IV-VI, Group I-III-VI, Group II-IV-VI, Group II-IV-V semiconductor compounds, alloys thereof, and combinations thereof.

7. The nanocrystal-metal oxide complex according to claim 6, wherein the nanocrystal is composed of a nanocrystal material selected from the group consisting of CdS, CdSe, CdTe, ZnS, ZnSe, ZnTe, HgS, HgSe, HgTe, GaN, GaP, GaAs, InP, InAs, InSb, AlN, AlP, AlAs, AlSb, SiC, Fe, Pt, Ni, Co, Al, Ag, Au, Cu, FePt, Si, Ge, PbS, PbSe, PbTe, alloys thereof, and mixtures thereof.

8. The nanocrystal-metal oxide complex according to claim 1, wherein the nanocrystal has a core-shell structure.

9. The nanocrystal-metal oxide complex according to claim 8, wherein the nanocrystal core is selected from the group consisting of CdS, CdSe, CdTe, ZnS, ZnSe, ZnTe, HgS, HgSe, HgTe, GaN, GaP, GaAs, InP, InAs, InSb, AlN, AlP, AlAs, AlSb, SiC, Fe, Pt, Ni, Co, Al, Ag, Au, Cu, FePt, Si, Ge, PbS, PbSe, PbTe, alloys thereof, and mixtures thereof, and the nanocrystal shell is selected from the group consisting of ZnS, ZnSe, ZnTe, CdS, CdSe, CdTe, HgS, HgSe, HgTe, AN, AlP, AlAs, AlSb, GaN, GaP, GaAs, GaSb, GaSe, InN, InP, InAs, InSb, TlN, TlP, TIAs, TlSb, PbS, PbSe, PbTe, alloys thereof, and mixtures thereof.

10. An electronic device comprising the nanocrystal-metal oxide complex according to claim 1.

11. The electronic device according claim 10, wherein the electronic device is selected from the group consisting of displays, lasers, linear photodiodes, sensors, and photovoltaic devices.

* * * * *